United States Patent
Jensen

(10) Patent No.: US 9,947,216 B2
(45) Date of Patent: Apr. 17, 2018

(54) PEDESTRIAN SAFE CROSSING VEHICLE INDICATION SYSTEM

(71) Applicant: Paul W. Jensen, Eugene, OR (US)

(72) Inventor: Paul W. Jensen, Eugene, OR (US)

( * ) Notice: Subject to any disclaimer, the term of this patent is extended or adjusted under 35 U.S.C. 154(b) by 0 days.

(21) Appl. No.: 14/588,571

(22) Filed: Jan. 2, 2015

(65) Prior Publication Data

US 2015/0194053 A1 Jul. 9, 2015

Related U.S. Application Data

(60) Provisional application No. 61/924,523, filed on Jan. 7, 2014.

(51) Int. Cl.
 *G08B 21/00* (2006.01)
 *G08G 1/005* (2006.01)
 *B60Q 1/44* (2006.01)

(52) U.S. Cl.
 CPC ............ *G08G 1/005* (2013.01); *B60Q 1/442* (2013.01)

(58) Field of Classification Search
 CPC ............................... B60Q 1/442; G08G 1/005
 USPC ......................................................... 340/479
 See application file for complete search history.

(56) References Cited

U.S. PATENT DOCUMENTS

| | | | |
|---|---|---|---|
| 4,940,962 A | 7/1990 | Sarokin | |
| 4,956,632 A * | 9/1990 | Perrigo | B60Q 1/52 340/463 |
| 5,188,445 A | 2/1993 | Haun | |
| 5,373,426 A | 12/1994 | O'Sullivan | |
| 5,663,707 A * | 9/1997 | Bartilucci | B60Q 1/302 340/464 |
| 5,680,101 A | 10/1997 | Pitcher | |
| 5,758,944 A | 6/1998 | Jandron | |
| 6,152,587 A * | 11/2000 | Berg | B60R 1/1207 340/468 |
| 6,864,787 B1 | 3/2005 | Veach | |
| 2003/0169165 A1 * | 9/2003 | Hall | B60Q 1/442 340/479 |
| 2009/0024394 A1 * | 1/2009 | Nakashima | G08G 1/005 704/275 |
| 2009/0109014 A1 * | 4/2009 | Jones | B60Q 1/50 340/468 |
| 2014/0035740 A1 * | 2/2014 | Lettstrom | B60Q 1/0035 340/479 |

* cited by examiner

*Primary Examiner* — Mark Rushing
(74) *Attorney, Agent, or Firm* — Global Intellectual Property Agency, LLC; Jordan Sworen

(57) ABSTRACT

An indicator system and method for a vehicle is provided that uses forward-directed indicators to signal to pedestrians when the vehicle is yielding to crossing pedestrians. The system monitors the vehicle brakes and the speed of the vehicle. One or more sets of indicator lights are deployed along the forward portion of the vehicle. When the vehicle brakes are applied, one set of indicator lights is energized. When the vehicle speed slows below a defined speed to indicate yielding, either a second set of indicators illuminate or the first set is pulsed. The second set of indicators is a different color than the first, and can pulse or energize statically. The indicator lights are preferably green in color when energized to indicate yielding to pedestrians, providing a positive signal that it is safe to cross the road in front of the vehicle.

16 Claims, 2 Drawing Sheets

PEDESTRIAN SAFE CROSSING VEHICLE INDICATION SYSTEM

CROSS REFERENCE TO RELATED APPLICATION

Figure 1:
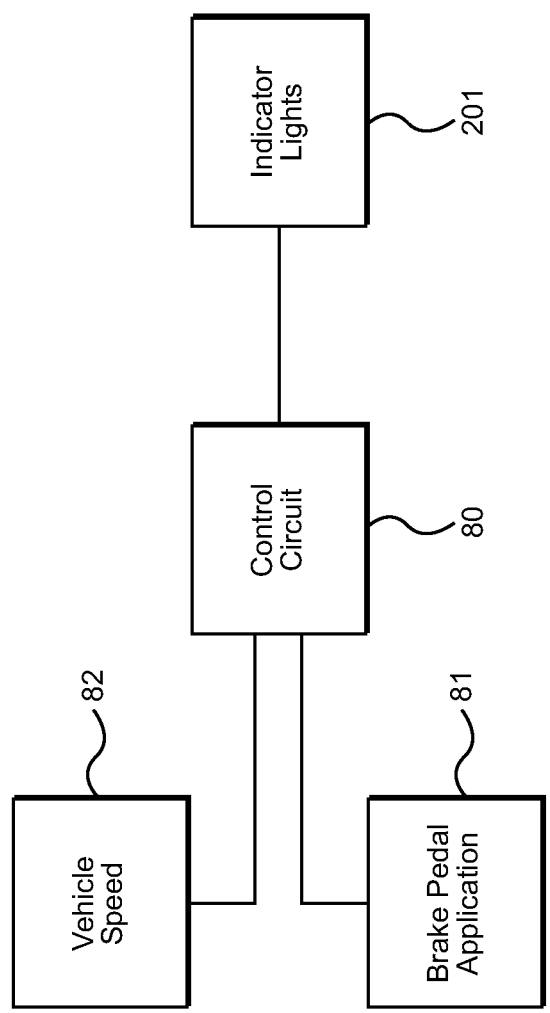

This application claims the benefit of U.S. Provisional Application No. 61/924,523 filed on Jan. 7, 2013. The above identified patent application is herein incorporated by reference in its entirety to provide continuity of disclosure.

BACKGROUND OF THE INVENTION

Field of the Invention

The present invention relates to vehicle indicators and light systems. More specifically, the present invention relates to a pedestrian notification system that activates forward-looking lights on the vehicle when the vehicle is traveling at a low speed and the brakes are activated, thereby notifying pedestrians of the actions of the vehicle and a condition in which it is safe to cross the road ahead of the approaching vehicle. The system is adapted to provide a "go" indication for pedestrians and to avoid miscommunications in populated, in-town areas.

Pedestrian crosswalks are common in urban areas and small towns, whereby a dedicated pathway is provided for crossing pedestrians. In most states and towns, approaching vehicles must yield to pedestrians on the crosswalk, allowing the pedestrian to cross as the vehicle slows or stops to allow cross traffic. Mandating that vehicles yield to pedestrians improves safety, whereby providing the right of way to pedestrians ensures fewer miscommunications. In addition, reduced speed limits in these areas act to improve pedestrian safety.

However, not all motorists obey the local or state law for pedestrian right of way. This causes pedestrians to be wary of approaching vehicles and wait until the vehicle has clearly shown that it is slowing or coming to a stop before entering the crosswalk. This is common sense and an appropriate safety measure to avoid collisions and injury. However, pedestrians must watch the vehicle closely to verify that indeed the vehicle is slowing down and yielding to the crosswalk, which can be deceiving or difficult at times.

Therefore, improved communication between motorists and pedestrians is needed in the art. Devices exist that contemplate brake lights placed along the forward portion of a vehicle to signify to pedestrians that the motorists is braking and therefore yielding. These are generally standard brake lights that project a red light indication when the brake pedal is depressed in the vehicle. While useful, this form of pedestrian communication is not completely clear and does not indicate whether it is safe to cross, or if the vehicle has effectively slowed down to allow safe passage across the crosswalk before a complete stop.

The present invention provides a pedestrian warning system along the front of a vehicle that signifies to the pedestrian that it is safe for the pedestrian to proceed across the walkway as the vehicle approaches the same. Rather than a brake light, the present invention contemplates a green safe signal, whereby one or more light assemblies are deployed on the vehicle and activate when the vehicle is traveling at a low traveling speed (i.e. in an urban environment or town center). Once below a first speed threshold, the lights activate when the brake pedal is applied. When the speed drops below a second, lower threshold, the lights flash as long as the brake pedal is applied. When the brake pedal is released, the green indicator lights cease to flash or illuminate. The goal of the present invention is to provide a positive indicator for pedestrians that it is safe to cross the road in front of a vehicle, indicating the vehicle is braking and coming to a stop, and therefore indicating the recognition of the motorist of the pedestrian right of way.

Description of the Prior Art

Devices have been disclosed in the prior art that relate to forward mounted brake light systems. These include devices that have been patented and published in patent application publications. The devices of the prior art most relate to standard, red brake light indicators that provide pedestrians with a brake light indicator along the front portion of the vehicle. By contrast, the present invention contemplates a green "go" signal, whereby the lights function in two states based on two speed thresholds. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 5,188,445 to Haun, which discloses a lighting configuration for an emergency response vehicle. A warning light is mounted within a recess in the hood of the vehicle, whereby the light is visible in front of the vehicle and the light housing does not block air flow to the radiator. The Haun device, while related to forward-looking light assemblies on a vehicle, is related to emergency vehicles and ambulances. The present invention is related to indicator lights on passenger vehicles, in which the lights are active when the vehicle is at low speed and where pedestrian traffic is most likely to be implicated.

Another device is U.S. Pat. No. 5,758,944 to Jandron discloses forward-looking brake lights that are operative when the vehicle brakes are applied. The light is a red hue and is disposed within a light frame that also carries the front turn signals. When the brakes are applied, a red brake light indication is given from the front of the vehicle to warn pedestrians and bicyclists ahead of the vehicle.

U.S. Pat. No. 5,680,101 to Pitcher discloses yet another forward-looking brake light, in which a dash-mounted brake light assembly is provided that illuminates when the brakes of the vehicle are applied. The bulb is positioned within a housing mounted on the dash and is in electrical connection with the brake light electrical system. The unit illuminates continuously when the brakes are applied and ceases when they are not applied.

U.S. Pat. No. 6,864,787 to Veach discloses a front-mounted light system in which three lights form an inverted triangle shape. The lights are disposed along the front bumper of the vehicle and are responsive to brake pedal inputs, whereby the rear brake lights and front brake lights both illuminate when the brake pedal is depressed. The middle front brake light is disposed between and below the headlights of the vehicle, while a first and second brake light are positioned above and outward from the middle front brake light.

U.S. Pat. No. 4,940,962 to Sarokin discloses a brake light indication device that includes a pair of front-mounted lights and an assembly that can determine the brake pedal depression and the speed of the vehicle. When the vehicle reaches a predetermined speed, the lights are illuminated when the system registers brake pedal actuation. A second sensor measures further depression of the brake pedal. The first light illuminates when the first sensor measures brake application, while the second light illuminates when further depression is applied.

U.S. Pat. No. 5,373,426 to O'Sullivan discloses a front brake light assembly that is operable when the brake pedal is depressed, and furthermore provides a flashing feature that activates when the vehicle decelerates after brake application. A flashing unit in connection with a servo-operated aperture energizes the lights in a flashing configuration when deceleration is detected. Further embodiments contemplate varying the intensity of the brake light based on brake pedal pressure.

The present invention provides an indicator system for pedestrians that is mounted to the front of a vehicle and activated when the motorist applies the brake pedal and when the vehicle speed is below one of two speed thresholds. The light sources are green in color to indicate a positive signal that the pedestrians are safe to cross the road in front of the vehicle, and the system activates as either a static set of lights or a flashing set of lights depending on the vehicle speed. Notably, the system receives signals from the vehicle speed sensor and from the brake pedal sensor, statically illuminating when the vehicle speed is below a first threshold. When the vehicle speed crosses a lower, second threshold, the forward lights flash, indicating a safe situation in which pedestrians can cross the road in front of the vehicle.

The present invention relates to pedestrian safety and indicators therefor. The system addresses drawback in the art, and employs a configuration that diverges in elements from the prior art. Consequently it is clear that there is a need in the art for an improvement to existing pedestrian warning devices. In this regard the instant invention substantially fulfills these needs.

SUMMARY OF THE INVENTION

In view of the foregoing disadvantages inherent in the known types of vehicle indicators and pedestrian warning systems now present in the prior art, the present invention provides a new pedestrian warning system for a vehicle that is utilized to indicate to nearby pedestrians that the vehicle is reducing speed to allow the pedestrians to safely cross a pedestrian crosswalk.

It is therefore an object of the present invention to provide a new and improved vehicle indicator system for pedestrians that has all of the advantages of the prior art and none of the disadvantages.

It is another object of the present invention to provide a vehicle indicator system that alerts pedestrians that the oncoming vehicle is slowing down to allow the pedestrian to cross the street, whereby one or more green signals indicate it is safe to cross in front of the vehicle.

Another object of the present invention is to provide a vehicle indicator system that is connected to the vehicle brake indicator system and to the vehicle speed sensor, whereby the system can register when the brakes are applied and further when the vehicle has cross a threshold below a defined speed to indicate safe passage for pedestrians.

Yet another object of the present invention is to provide a vehicle indicator system that includes dual modes: a first static indicator when the brakes are applied, and a flashing indicator when the vehicle has reduced its speed to a minimum speed that would indicate the vehicle is coming to a stop or near-stop to allow pedestrians to cross in front of the vehicle.

Another object of the present invention is to provide a vehicle indicator system that provides clear indication for pedestrians in congested areas or in town centers, whereby pedestrians do not have to judge the vehicle speed and can simply visualize the lights on the vehicle, which mimic lighted street signs.

Another object of the present invention is to provide a vehicle indicator system that may be installed on existing vehicles or be present on new, production vehicles, whereby the lighting arrangement includes one or more green forward-directed lights along the front portion of the vehicle.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 illustrates a high level schematic of the system of the present invention.

Figure 2:
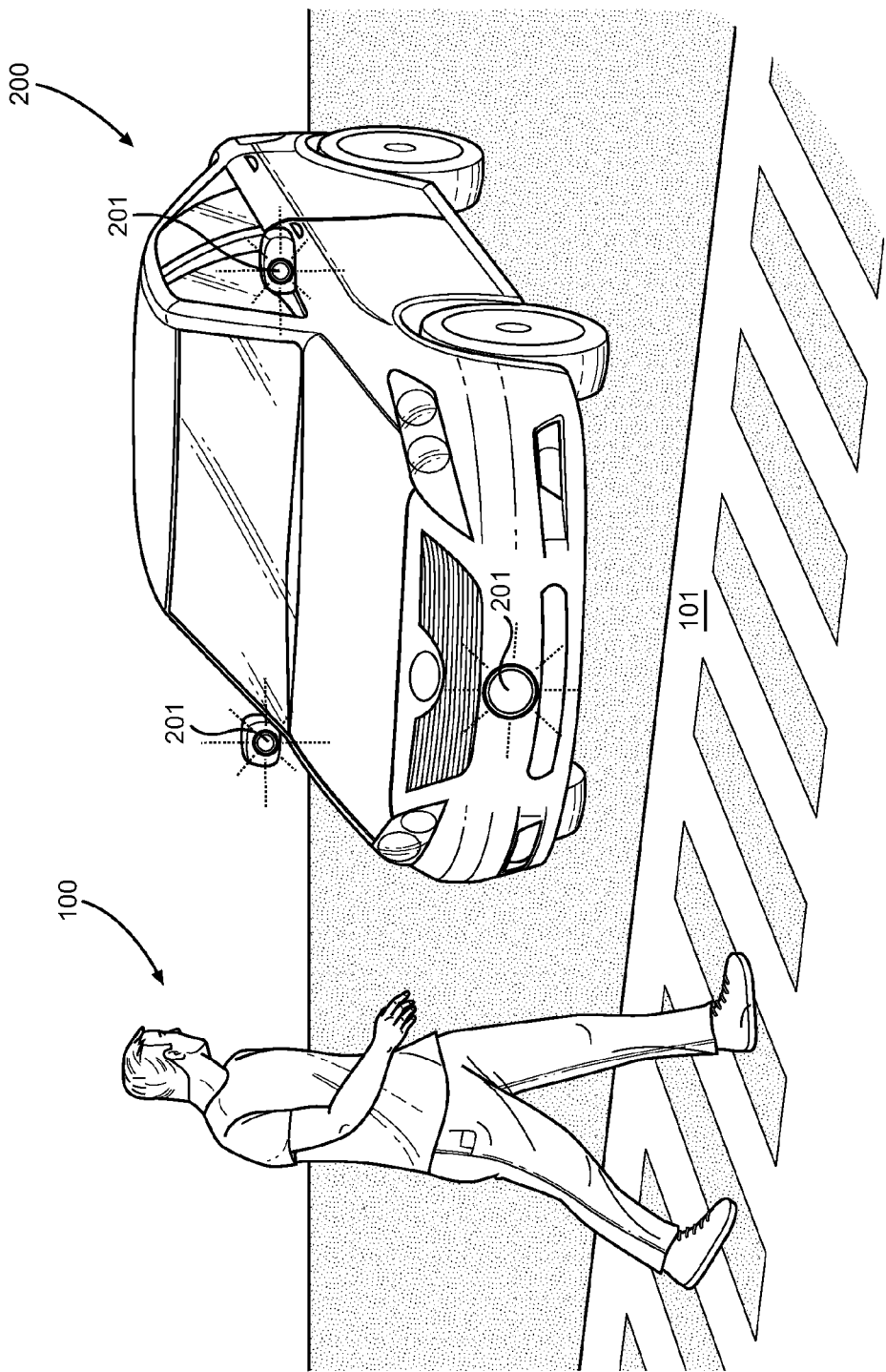

FIG. 2 provides an illustrative view of a vehicle supporting the vehicle indicator system of the present invention, and a pedestrian using the indicators to recognize when it is safe to cross in front of the slowing vehicle.

DETAILED DESCRIPTION OF THE INVENTION

Reference is made herein to the attached drawings. Like reference numerals are used throughout the drawings to depict like or similar elements of the vehicle indicator system of the present invention. For the purposes of presenting a brief and clear description of the present invention, the preferred embodiment will be discussed as used for indicating to pedestrians a safe environment in which to cross the road in front of a slowing vehicle. The figures are intended for representative purposes only and should not be considered to be limiting in any respect.

Referring to FIGS. 1 and 2, the present invention comprises a method and a system that is designed to provide pedestrians of a signal on a vehicle 200 that indicates the vehicle 200 is slowing down as it approaches a crosswalk 101, and further that the situation is safe for the pedestrian 100 to cross the road in front of the vehicle as it comes to a stop. Specifically, the system is supported on a vehicle 200 and is connected to the brake indicator system and the vehicle speed sensor. These connections may be wired connections to specific components, such as specific connections to the brake pedal itself and a vehicle speed sensor, or alternatively the system may tie into the electronic control unit (ECU) of the vehicle and receive signals for the brake pedal position and the vehicle speed. In any embodiment, the system includes a pair of inputs: brake pedal application 81 and vehicle speed 82.

The system uses these inputs to provide an output in the form of a visual signal along the front of a vehicle. The visual signal comprises one or more green light indicators 201 disposed along the front portion of the vehicle and directed forward such that pedestrians ahead of the vehicle can visualize the status of the lights. The lights include three states: (1) a null state in which the indicators are not energized, (2) an energized state in which the indicators are active in a static state, and finally (3) a flashing state in which the indicators are pulsed on and off. Alternatively the three states may be a null state, a first color indicator, and a second color indicator, respectively.

The indicators 201 preferably include a green color lens or a green bulb, whereby the indicator energizes in a similar color as a traffic signal green light. Green is used as a means to indicate pedestrians can "GO" or cross the road in front of the vehicle. The different states of the indicators provide different signals to pedestrians, who over a period of use will become accustomed to understanding the indication pattern. Once aware, the indication provides users with a signal of when it may be safe to cross in front of the vehicle as the vehicle slows and yields to the pedestrian.

In a first embodiment, the indicator provides either a static or a flashing signal. When the brake pedal is applied, the indicators statically illuminate (energize) to signal to pedestrians that the vehicle has applied the brakes in anticipation of yielding to pedestrians. When the system registers the vehicle has slowed to a speed below a defined threshold, the indicators are pulsed in a flashing manner. The flashing state of the indicators signal to pedestrians that the vehicle is nearly stopped and it is safe to cross the road.

In a second embodiment, a set of indicators is energized when the brakes of the vehicle are applied, and a second set of indicators are energized when the vehicle slows below a defined threshold speed. The first set of indicators may comprise a static yellow indicator, thereby indicating that the vehicle is slowing down. The second set of indicators is a green color, whereby after the vehicle has slowed below a defined vehicle speed, the second set of indicators is illuminated. The green signal is a signal to pedestrians that the vehicle is nearly stopped and the road is safe to cross. The second set of indicators may pulse or they may illuminate statically, depending upon the design of the system.

In a first embodiment, the indicator provides either a static or a flashing signal. When the brake pedal is applied, the indicators statically illuminate (energize) to signal to pedestrians that the vehicle has applied the brakes in anticipation of yielding to pedestrians. In some embodiments, the indicators are pulsed for a set amount of time, such as three to four seconds, when the brakes are applied before returning to constant illumination. When the system registers the vehicle has slowed to a speed below a defined threshold, the indicators are pulsed in a flashing manner. The flashing state of the indicators signal to pedestrians that the vehicle is nearly stopped and it is safe to cross the road.

When the speed of the slowing vehicle is below a programmed threshold as defined by the control circuit, the control circuit either flashes the indicator lights or energizes the second set of indicator lights and turns off the first set of indicator lights (if more than one set is provided). In the first embodiment, the indicator lights are flashed using a flasher unit, which pulses the current to the indicators. In another embodiment, a second set of indicators are illuminated, and either statically illuminated or pulsed using a flasher unit.

When the vehicle brake released, the indicators are no longer energized and no pedestrian light signals are illuminated along the front of the vehicle. Therefore, the method of the present invention comprises monitoring the speed and brake system of a vehicle to determine vehicle speed and brake pedal application. One or more sets of forward-looking indicator lights are positioned along the front portion of a vehicle. A control circuit is used to receive the brake system and vehicle speed signals. When the brakes of the vehicle are applied, either (1) a first set of indicator lights are energized, or (2) all indicator lights are energized. When the vehicle speed falls below a defined threshold, either (1) the first set of indicator lights is turned off and a second set of indicator lights are energized, or (2) all indicators are pulsed. If the second set of indicator lights is energized, the indicators may be pulsed or energized statically. When the brake pedal is released, the indicator lights cease to be energized. Contemplated minimum speed thresholds are below 10 MPH; however the exact speed may be programmed to a different speed as required. If a first and second set of indicators are provided, the first and second set are preferably different colors (for instance, yellow when the brakes are applied, and green when the vehicle is below the speed threshold).

Motor vehicles possess conventional brake lights that are installed on the back of the vehicle. This is an instrumental safety feature that affords a means for a driver to recognize whether or not another driver that is in front of said driver has applied the brakes of their motor vehicle. However, pedestrians cannot tell whether or not the driver located in the vehicle is applying the brakes and/or whether or not they intend to stop their vehicle before a cross pedestrian. The present invention provides such a warning system that indicates positively to the pedestrian that first, the brakes of the vehicle are applied, and second, that vehicle has slowed to a sufficient degree that the motorist is yielding to the pedestrian and it is safe to cross. These two states correspond with the state of the indicators (static/pulsing, or first set/second set illuminated). It is intended to reduce confusion between pedestrians and motorists, and thereby prevent avoidable accidents that may otherwise result.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of signaling pedestrians in front of a vehicle to indicate vehicle status, comprising the steps of:
   deploying one or more sets of forward-looking indicator lights along the forward portion of a vehicle;
   receiving brake pedal signals when brakes on said vehicle are applied;
   receiving vehicle speed signals from said vehicle to determine a speed of said vehicle;
   energizing a first set of forward-looking indicator lights when said brakes on said vehicle are applied;
   pulsing said first set of forward-looking indicator lights for a set amount of time when said brakes on said vehicle are applied;

pulsing said first set of forward-looking indicator lights when said speed of said vehicle is below a defined threshold;

wherein a control circuit is used to receive said brake pedal signals, to receive said vehicle speed signals, to energize said first set of forward-looking indicator lights, and to pulse said first set of forward-looking indicator lights;

wherein the set amount of time is determined by the control circuit.

2. The method of claim 1, wherein: said vehicle speed signals are received from a vehicle speed sensor on said vehicle.

3. The method of claim 1, wherein: said brake pedal signals are received from a brake pedal position sensor.

4. The method of claim 1, wherein: said brake pedal signals are received from a brake light circuit.

5. The method of claim 1, wherein: said brake pedal signals are received from an electronic control unit on said vehicle.

6. The method of claim 1, wherein: said one or more sets of forward-looking indicator lights are green in color.

7. A method of signaling pedestrians in front of a vehicle to indicate vehicle status, comprising the steps of:
deploying a first set of forward-looking indicator lights and a second set of forward-looking indicator lights along the forward portion of a vehicle;
said first set of forward-looking indicator lights and said second set of forward-looking indicator lights being different colors;
receiving brake pedal signals when brakes on said vehicle are applied;
receiving vehicle speed signals from said vehicle to determine a speed of said vehicle;
energizing said first set of forward-looking indicator lights when said brakes on said vehicle are applied when said speed of said vehicle is above a defined threshold;
de-energizing said first set of forward-looking indicator lights when said speed of said vehicle is below a defined threshold;
energizing said second set of forward-looking indicator lights when said speed of said vehicle is below a defined threshold.

8. The method of claim 7, wherein said step of energizing said second set of forward-looking indicator lights when said speed of said vehicle is below a defined threshold, further comprises: pulsing said second set of forward-looking indicator lights.

9. The method of claim 7, wherein: a control circuit is used to receive said brake pedal signals, to receive said vehicle speed signals, to energize said first set of forward-looking indicator lights, and to energize said second set of forward-looking indicator lights.

10. The method of claim 7, wherein: said vehicle speed signals are received from a vehicle speed sensor on said vehicle.

11. The method of claim 7, wherein: said brake pedal signals are received from a brake pedal position sensor.

12. The method of claim 7, wherein: said brake pedal signals are received from a brake light circuit.

13. The method of claim 7, wherein: said brake pedal signals are received from an electronic control unit on said vehicle.

14. The method of claim 7, wherein: said first set of forward-looking indicator lights comprise a yellow color; and said second set of forward-looking indicator lights comprise a green color.

15. The method of claim 1, wherein one or more of said forward-looking indicator lights is disposed on the side mirrors of the vehicle.

16. The method of claim 7, wherein said first set of forward-looking indicator lights and said second set of forward-looking indicator lights are disposed on the side mirrors of the vehicle.

* * * * *